(No Model.) 2 Sheets—Sheet 1.
W. A. TEA.
AUTOMATIC INCLINE POOL BALL RACK AND SPOTTER.
No. 297,031. Patented Apr. 15, 1884.
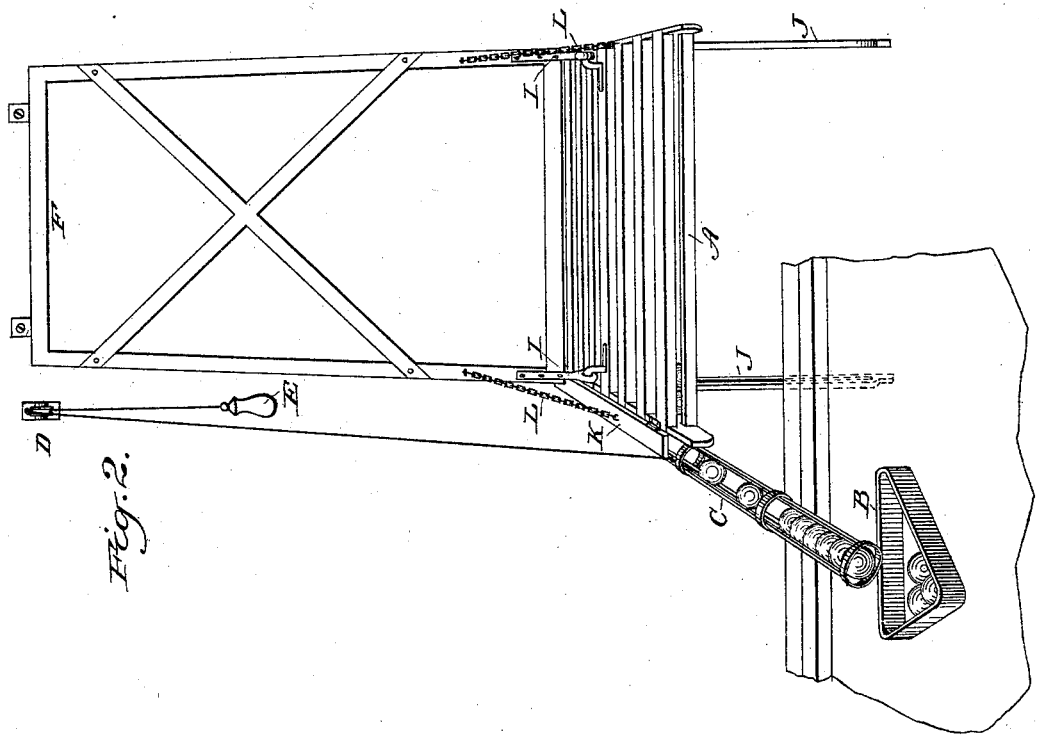
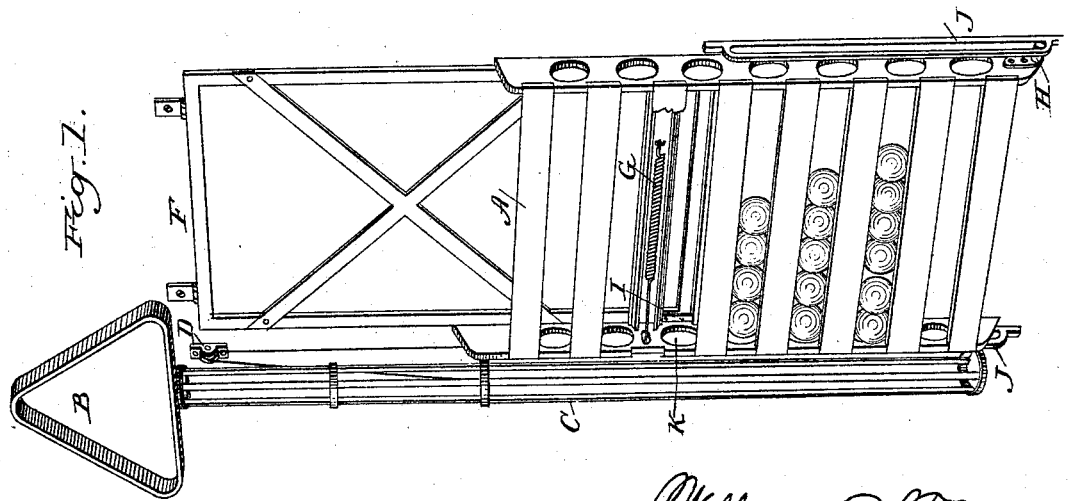
Witnesses:
G. S. Dewey
J. D. Fauch
William A Tea
Inventor:

(No Model.)
2 Sheets—Sheet 2.
W. A. TEA.
AUTOMATIC INCLINE POOL BALL RACK AND SPOTTER.
No. 297,031.
Patented Apr. 15, 1884.
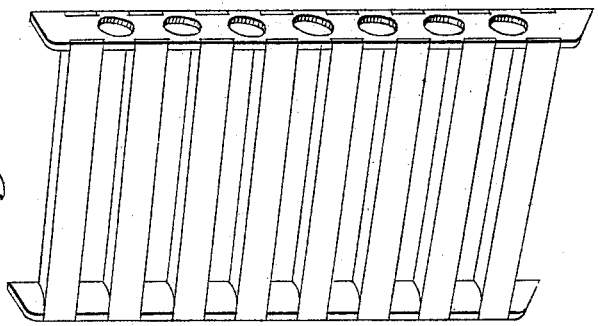
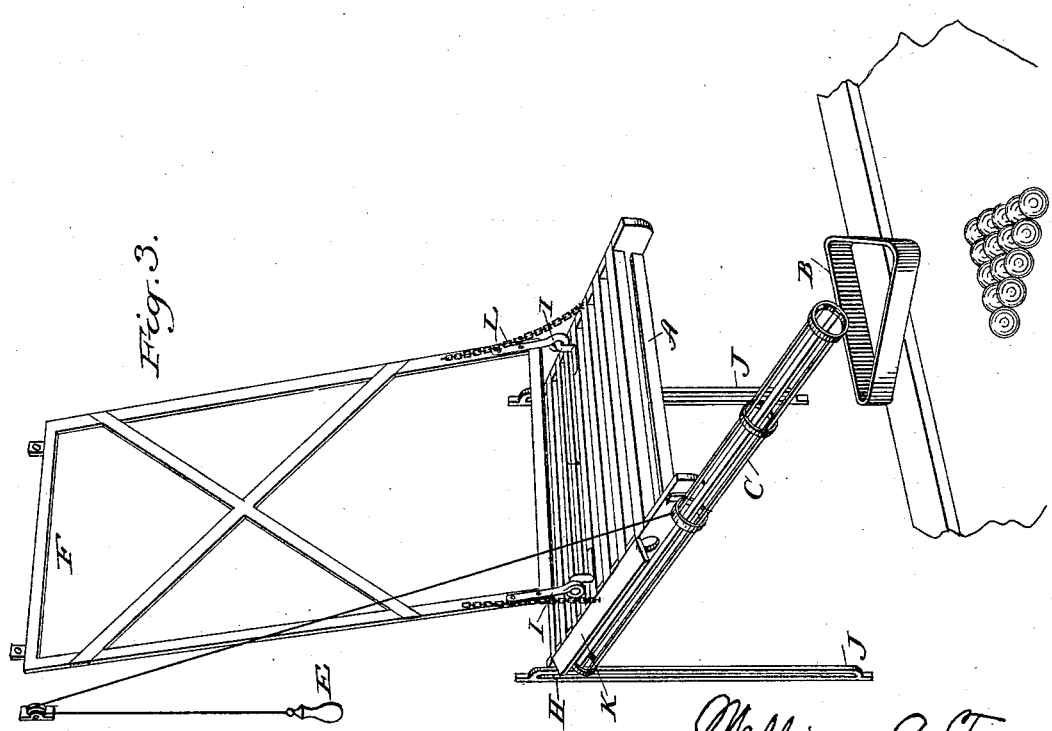
William A. Tea
Inventor:
Witnesses:

UNITED STATES PATENT OFFICE.

WILLIAM A. TEA, OF CLYDE, OHIO.

AUTOMATIC INCLINE POOL-BALL RACK AND SPOTTER.

SPECIFICATION forming part of Letters Patent No. 297,031, dated April 15, 1884.

Application filed January 12, 1884. (No model.)

*To all whom it may concern:*

Be it known that I, WILLIAM A. TEA, a citizen of the United States, residing at Clyde, in the county of Sandusky and State of Ohio, have invented an Improved and useful Combination Automatic Incline Pool-Ball Rack and Spotter, used for holding pool-balls and automatically placing the pool-balls on a pool-table when required; and I do hereby declare that the following is a full, clear, and exact description of the construction and operation of the same, reference being had to the annexed drawings, made a part of this specification, in which—

Figure 4 shows the pool-ball rack as now used. Fig. 1 shows the pool-ball rack with my invention attached. Fig. 2 shows the pool-ball rack in operation, placing the pool-balls automatically upon the pool-table. Fig. 3 shows the pool-ball rack, after placing the balls on the table, as it is being brought back to place by means of weight and pulley.

The nature of my invention consists in providing a place for keeping a given number of pool-balls, which can be placed on a pool-table when desired, and at the same time spotted or bunched in a triangle by simply moving the conductor or tube until it strikes the pool-table, when the balls pass down an incline into the slotted tube, as fully shown in Fig. 2.

To enable others to make and use my invention, I will proceed to describe its construction and operation.

In Fig. 1, the letter A represents a pool-ball rack as universally used.

B represents the triangle attached to the slotted tube or conductor.

C represents a slotted tube or conductor, made of strips of wood or other material fastened together with brass or nickle-plate bands. This tube is used to conduct the balls onto the table.

D represents a pulley used in bringing the tube and rack back to place when not in use.

E represents a weight at the end of a cord or wire.

F represents an adjustable frame, fastened to the side of room or building with hinges.

G represents a coil-spring, used to close an adjustable stop-door.

H H represent a roller-hinge, which works in the grooves J J.

I I represent the hinges upon which the rack A rests, as is fully shown in Fig. 3.

K represents a stop-door.

L L represent two chains used to give the rack an incline position, and at same time raise the stop-door K and allow the pool-balls to pass into the slotted tube, as is fully shown in Fig. 2.

The rack is so hung as to nearly balance itself, and by means of the slide-hinges herein described so adjusts itself as to form an incline track, allowing the pool-balls to pass out and into the tube, from thence onto the pool-table, where they are bunched in the triangle, which is done by dropping or lowering the tube C, as is fully shown in drawings hereto attached.

What I claim as my invention, and wish to secure by Letters Patent, is—

1. The combination, with a billiard-ball rack, of a tube attached to one side thereof, and means for raising and lowering the same, substantially as shown and described, whereby billiard-balls placed in the rack will be received in the tube and conducted to a table, as shown and described.

2. The combination, with a billiard-ball rack and a tube attached to one side thereof, of a triangular frame secured to the end of the tube, and means for raising and lowering the same, substantially as specified.

3. The combination, with a billiard-ball rack, A, provided with hinges I, and the tube C, attached thereto, of the frame F, hinged at one end to the rack at I, and at the other end to the wall, and the pulley D and weight and cord E, substantially as shown and described.

4. The combination, with the rack A, the tube C, the hinged frame F, the weight E, and pulley D, of the roller-hinges H on the rack, and the grooved ways J, as shown and described.

5. The combination, with the ball-rack A, the frame F, hinged thereto and to the wall, the roller-hinges H, the grooved ways J, and the tube C, of the brace-chains L, as shown and described.

6. The combination, with the rack A, hinged to swing, as described, and the tube C, connected thereto, of the stop-door K and the spring G, for returning the same, as shown and described.

7. The combination, with the rack A, hinged to swing as described, the tube C, attached thereto, and the stop-door K, hinged to the rack, of the two chains L, one connecting the rack and wall, and the other connecting the door K and the wall, as shown and described, the two chains being of such relative lengths that the rack A, when tipped down, will incline toward the tube C, and the door K will be held open, for the purpose specified.

WILLIAM A. TEA.

Witnesses:
G. S. DEWEY,
V. S. VOGT.